Sept. 4, 1962 H. LEEDOM 3,052,311
STEERING-BY-DRIVING ORGANIZATION FOR WHEELED TRACTORS
Filed Feb. 16, 1959 6 Sheets-Sheet 1

INVENTOR.
HARRY LEEDOM
BY
Christie, Parker & Hale
ATTORNEYS.

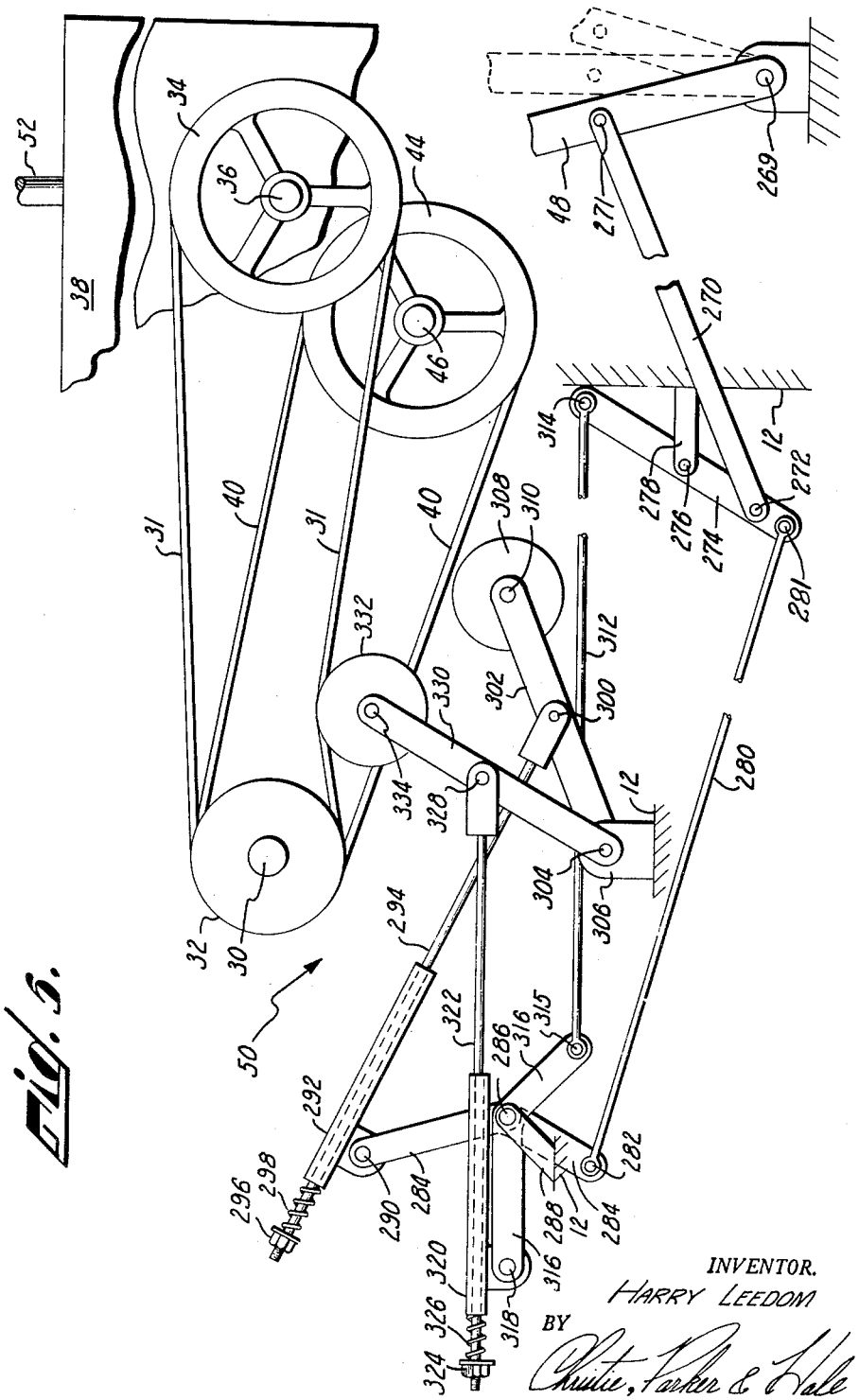

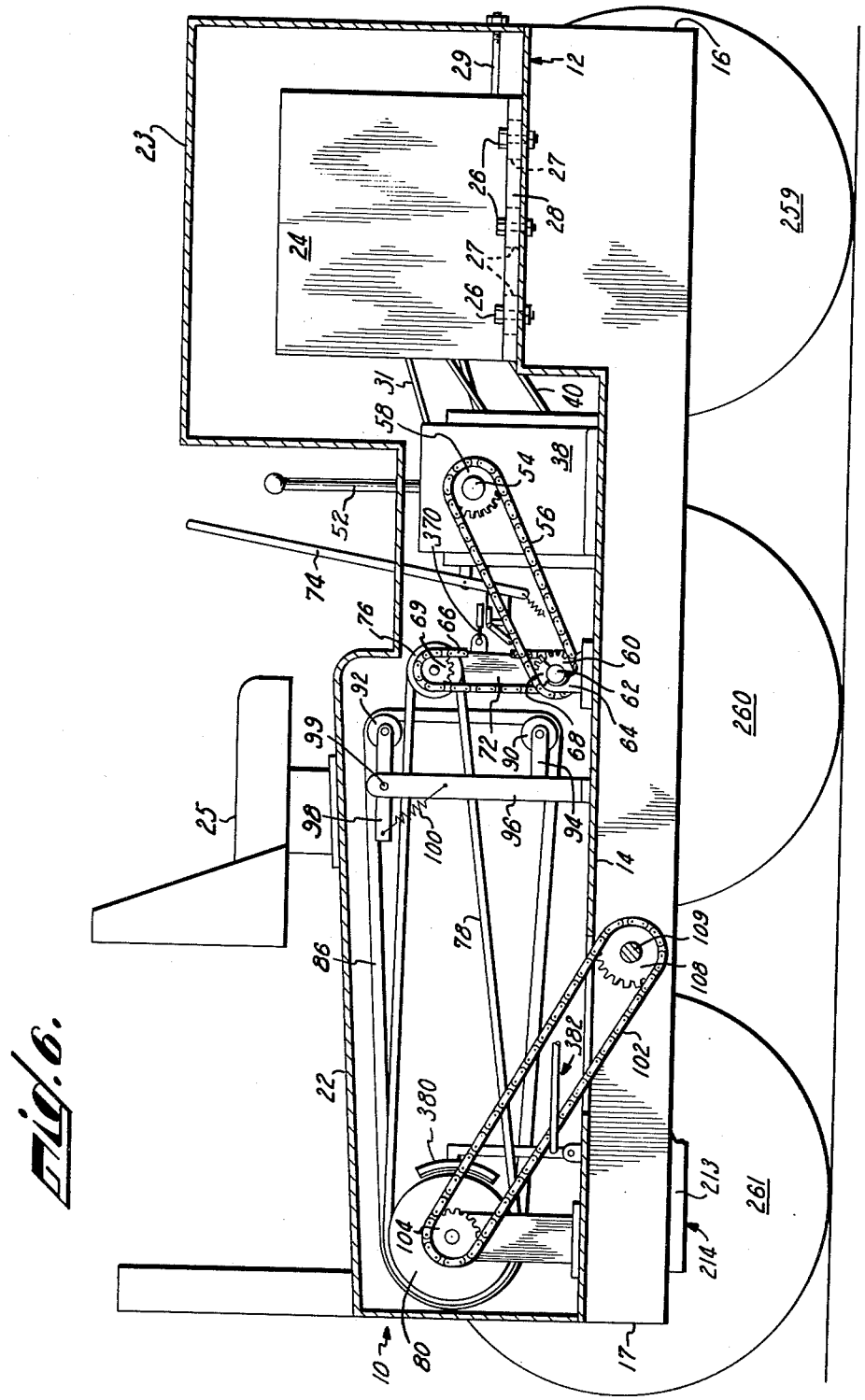

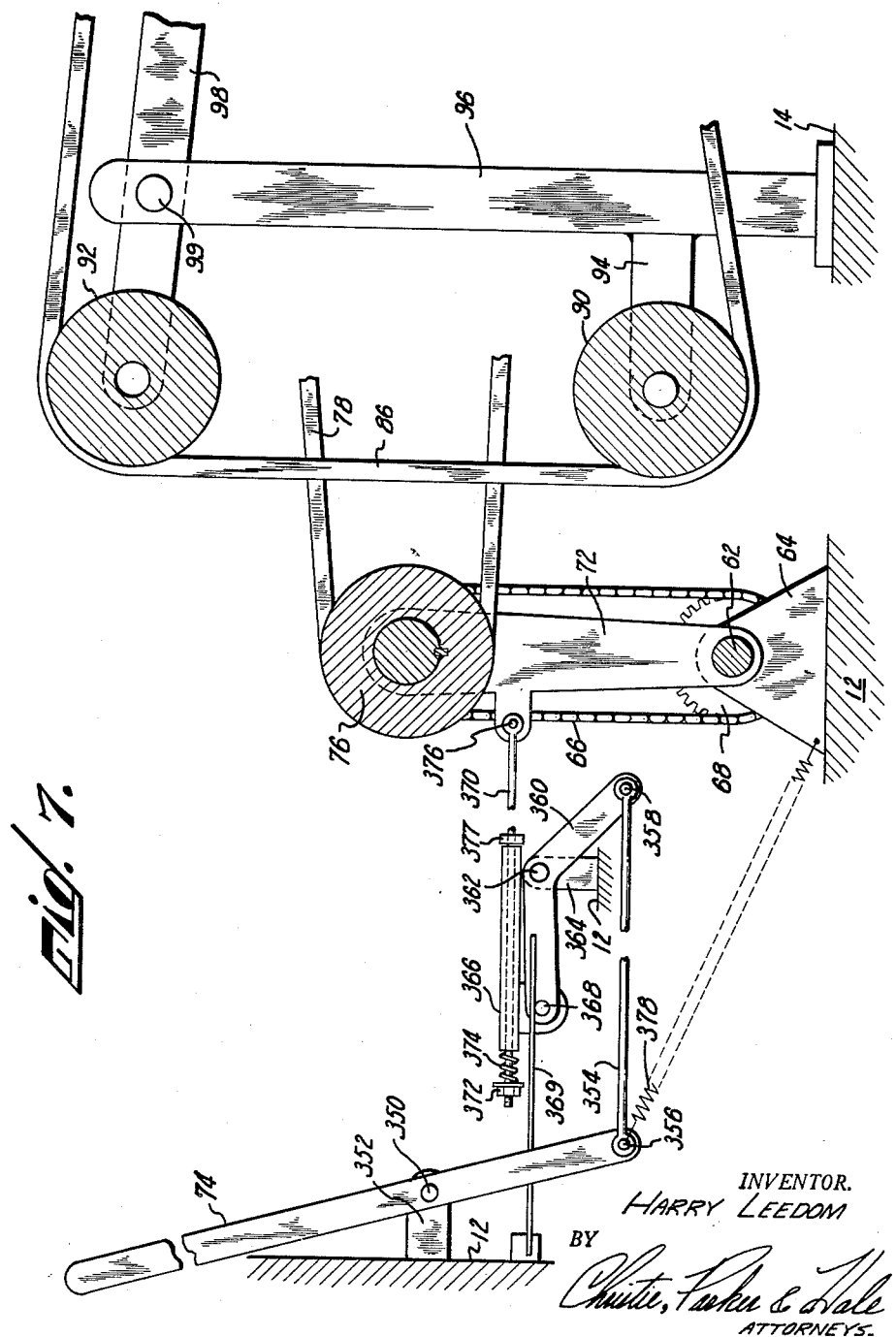

United States Patent Office 3,052,311
Patented Sept. 4, 1962

3,052,311
STEERING-BY-DRIVING ORGANIZATION
FOR WHEELED TRACTORS
Harry Leedom, Sonora, Calif., assignor to Octagon Development Corporation, Pasadena, Calif., a corporation of California
Filed Feb. 16, 1959, Ser. No. 793,622
6 Claims. (Cl. 180—6.66)

This invention relates to steering mechanisms for mobile vehicles adapted to move over the ground.

The steering mechanism of this invention permits a multi-wheel vehicle to be driven over rough and hilly terrain which usually requires a track type drive vehicle. A vehicle using this invention has virtually the same traction, with superior maneuverability, of a vehicle with a track type drive, and yet retains advantages and versatility of a pneumatic tired vehicle. The invention permits a multi-wheel vehicle to be steered with maneuverability not possible with present track type drives, it being possible to turn the vehicle about a vertical axis passing through the center of the vehicle.

Briefly, the invention contemplates a steering mechanism which includes a source of motive power mounted on a frame having forward and rear ends and right and left sides. A first set of rotatable wheels is mounted on the right side of the frame, and a second set of rotatable wheels is mounted on the left side of the frame. First and second steering transmissions respectively couple the power source to the first and second sets of wheels. Means are provided for independently adjusting the steering transmissions to drive their respective set of wheels forward and backward independently of each other. Thus, the sets of wheels on each side of the vehicle can be driven forward together, backward together, or one set forward and the other set backward. By rotating the wheels of one set in a direction opposite to those of the other set, the vehicel is turned without any forward or backward motion, giving the maximum maneuverability because the vehicle is turned in the shortest possible radius.

In the preferred form of the invention, the wheels of each set rotate together while the vehicle is being turned by rotating one set of wheels in a direction opposite to that of the other. In this way, any obstacles, such as large rocks, tending to prevent the vehicle from turning, are climbed over by the rotating wheels. The turning of each set of wheels in opposite directions also reduces lateral stress on the tires, which could damage them or push them off the wheel rims, and makes it possible for the tractor to turn in rocky, uneven terrain with a maneuverability not practical with presently available steering mechanisms. The rotation of the two sets of wheels in opposite directions during turning also reduces tire wear and avoids destructive pressure by continuously presenting a new area of tire contact during the turning manuever. In addition, this steering mechanism operates as well as a track type on all other types of ground, including soft, sandy, snow, side-hill, etc.

Preferably, the steering mechanism includes an odd number of wheels in each set, and the wheels in each set are ganged so that they rotate together in the same direction and at the same speed. With this arrangement, when the vehicle is turned by rotating one set of wheels in a direction opposite to that of the other, the vehicle turns about an upright axis located on a common axis between the two middle wheels of each set. Thus, only the fore and aft wheels in each set have any lateral strain, and this takes place only while the vehicle is turning, and is reduced by the rotation of the wheels.

These and other aspects of the invention will be more fully understood from the following detailed description taken in conjunction with the accompanying drawings in which:

FIG. 5 is a view taken on line 5—5 of FIG. 2;

FIG. 6 is a view taken on line 6—6 of FIG. 2; and

FIG. 7 is a view taken on line 7—7 of FIG. 2.

Figure 1:
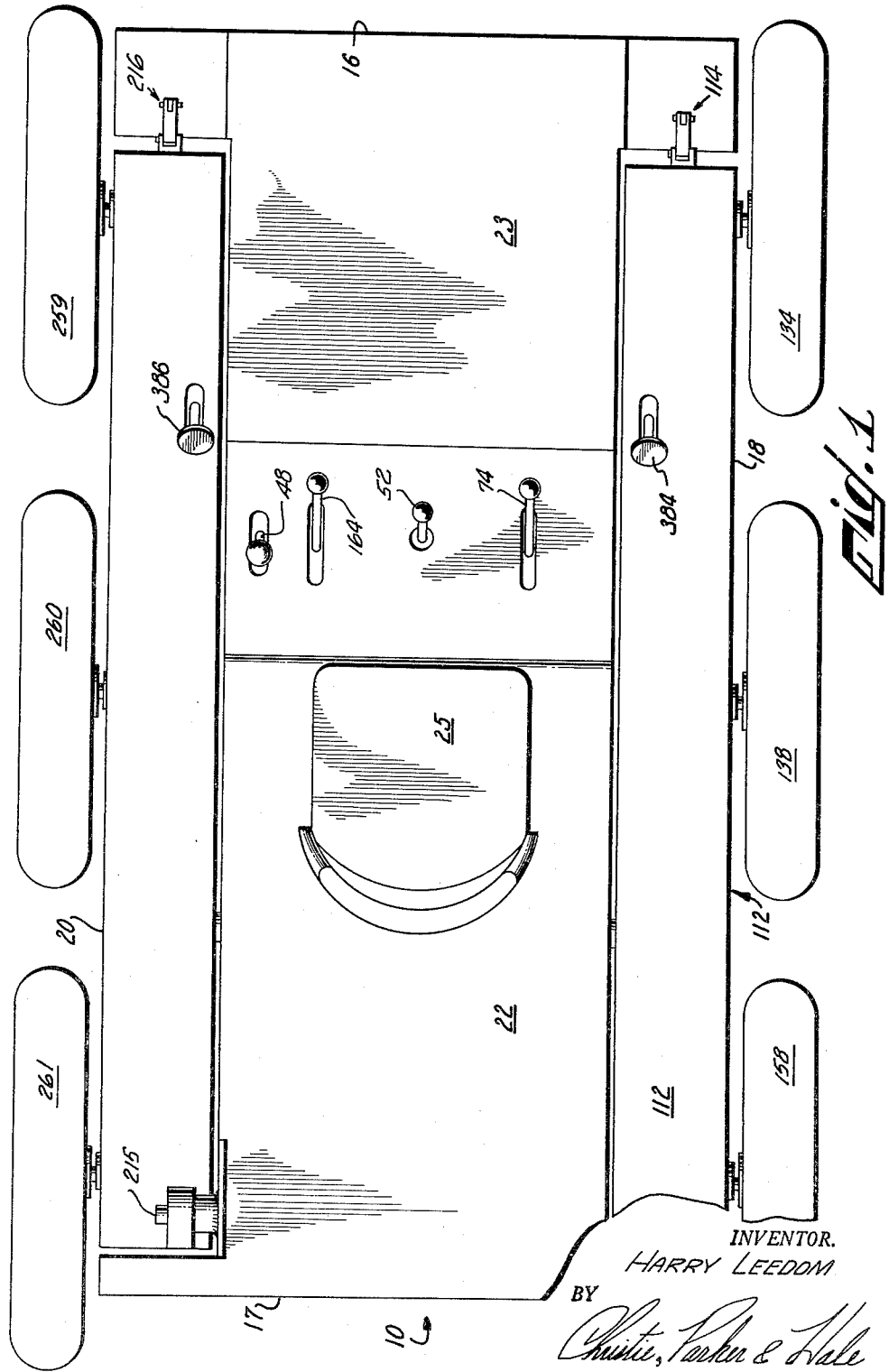
FIG. 1 is a plan view of a vehicle using the steering mechanism of this invention with three wheels on each side of the vehicle.

Referring to FIG. 1, a tractor 10 includes a frame 12 having a bottom 14, a forward end 16, a rear end 17, a right side 18, a left side 20, and a top 22, including a hood 23, which houses an engine 24 mounted on the bottom of the frame. A seat 25 is mounted on the frame top to the rear of the hood. The engine is secured to the bottom of the frame by bolts 26 disposed through longitudinal slots 27 formed in an outwardly extending flange 28 on the bottom of the engine. The forward end of the engine is secured to the frame by a longitudinally extending bolt 29 which permits the position of the engine to be adjusted longitudinally.

Figure 2:
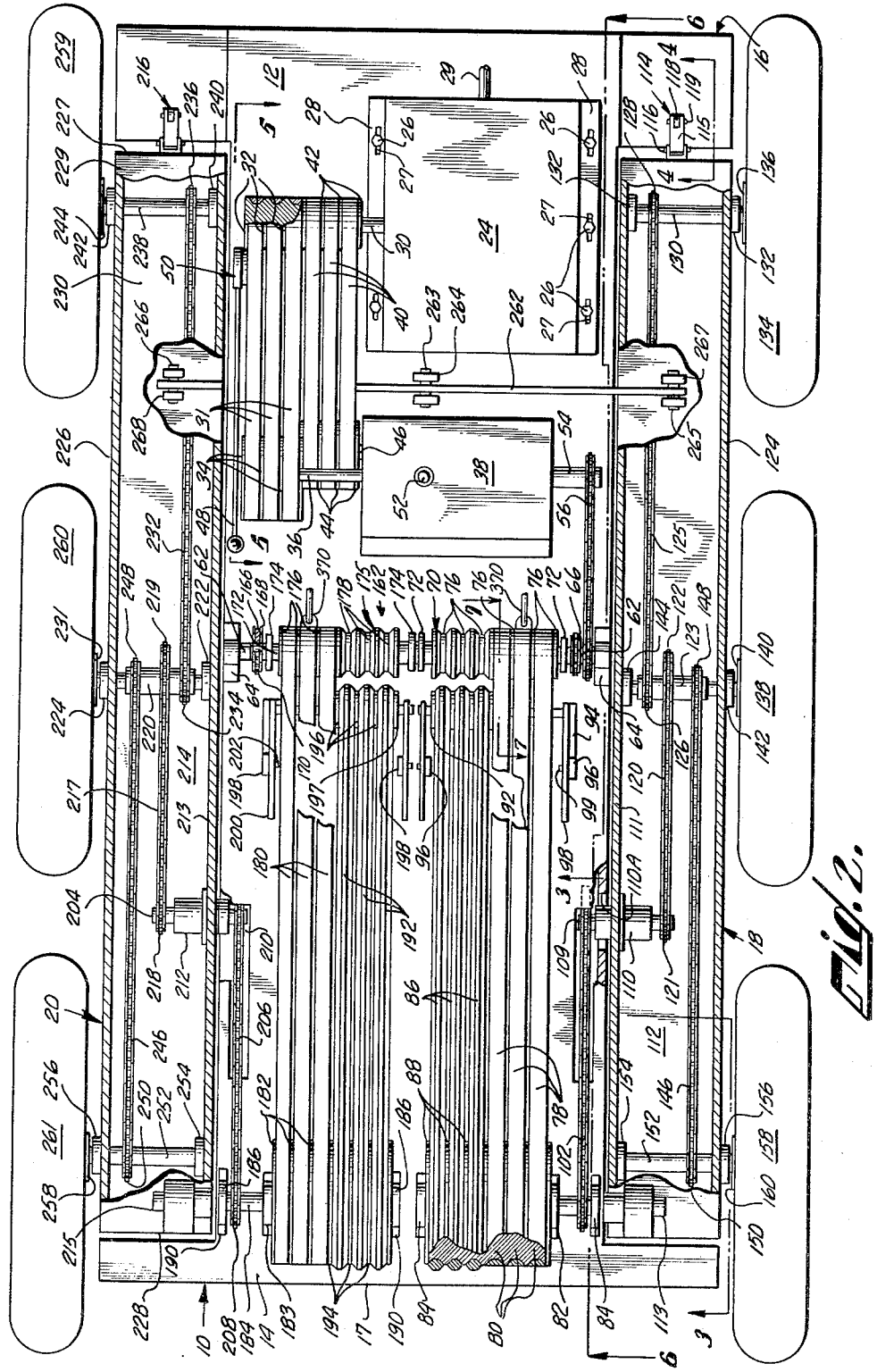
FIG. 2 is a plan view of the vehicle of FIG. 1 with a portion of the vehicle broken away to show the steering mechanism.

Referring to FIG. 2, the engine includes a transverse and horizontal output shaft 30 extending from the left side of the engine.

A set of three forward transmission belts 31 are disposed around three integrally formed pulleys 32 mounted on the outboard portion of the engine output shaft. The forward transmission belts 31 extend rearwardly and are disposed around three pulleys 34 mounted on an input shaft 36 extending horizontally from a four-speed transmission 38. A set of three reverse transmission belts 40 are each disposed around a separate respective pulley 42 mounted on the inboard portion of the engine output shaft. The reverse transmission belts extend rearwardly and are disposed around three separate respective pulleys 44 mounted on a horizontal reverse input shaft 46 extending from the four-speed transmission. A clutch lever 48 located on the outboard side of the forward transmission belts 31 controls a clutch system 50 (see FIG. 5), which is described in more detail below.

A gear shifting lever 52 on the transmission determines the speed of a transverse output shaft 54 extending horizontally from the right-hand side of the transmission. A power transmission chain 56 is disposed around a sprocket 58 mounted on the output shaft, and extends rearwardly around a sprocket 60 mounted on the right end of a horizontal and transverse power steering driving shaft 62 which extends across the bottom of the frame and is journalled at each end in bearings 64. A secondary power transmission chain 66 is disposed around a second sprocket 68 mounted at the right end of the driving shaft 62 and inboard of the first sprocket 60. The chain 66 is also disposed around a sprocket 69 on the right end of a transverse and horizontal right-hand rotatable driving roller 70 supported at each end by a pair of laterally spaced right-hand upright steering pivot arms 72 mounted at their lower ends to pivot on the driving shaft 62. The right-hand driving roller is moved longitudinally between pivot arms in response to the operation of a right-hand steering lever 74 as shown most clearly in FIG. 7 and explained in detail below.

The right-hand driving roller includes six V-notched pulleys 76. A set of three right-hand forward steering belts 78 are disposed around the three outboard pulleys on the right-hand driving roller, and extend rearwardly around three pulleys 80 on the outboard end of a transverse and horizontal right-hand driven steering drum 82 supported at each end by a pair of upright drum arms 84. A set of three right-hand reverse double-V steering belts 86 are disposed around three inboard pulleys 88 formed integrally on the inboard end of the right-hand driven drum and extend forwardly around a lower right-hand reverse idler 90 and an upper right-hand reverse idler 92. The lower idler is mounted on a longitudinal and horizontal bracket 94 secured at its rear end to the lower portion of an upright idler post 96 welded at its lower end to the frame bottom. The upper idler 92 is supported on the forward end of a horizontal and longitudinal idler arm 98 secured by a horizontal and transverse pivot pin 99 intermediate its ends to the upper end of the idler post. One end of a tension spring 100 is connected to the rear end of the idler arm and the other end of the spring is connected to the intermediate part of the idler post. The spring tends to pivot the idler arm counterclockwise (as viewed in FIG. 6) so that the reverse steering belts 86 are kept in substantially constant tension.

Figure 3:
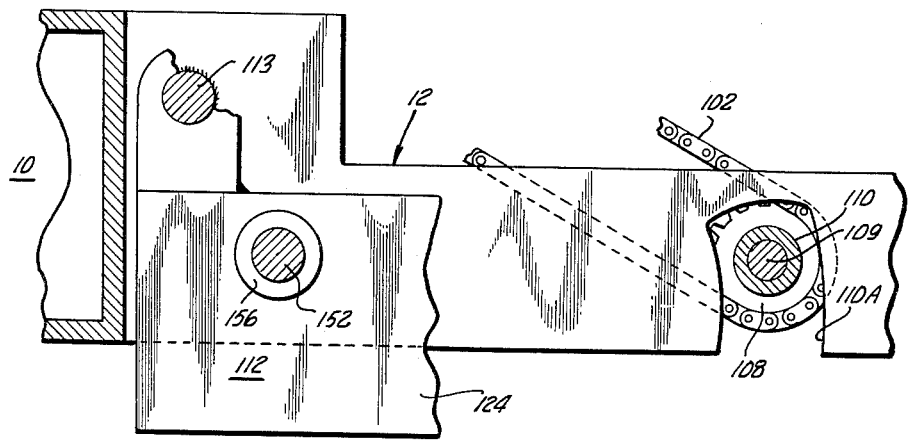
FIG. 3 is a view taken on line 3—3 of FIG. 2.
Figure 4:
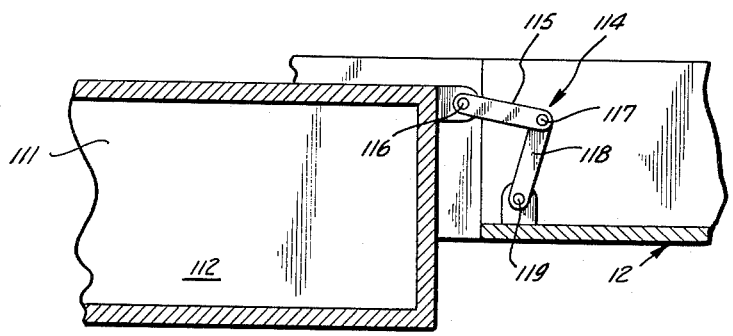
FIG. 4 is a view taken on line 4—4 of FIG. 2.

A right steering drive chain 102 is disposed around a sprocket 104 mounted on the right-hand end of the right-hand driven steering drum 82. The chain 102 extends forward over a sprocket 108 mounted on the inboard end of a transverse and horizontal shaft 109 journalled in an oil-sealed bearing 110 extending through a slot 110A in the right side of the frame and sealed through the inside wall 111 of a horizontal and rectangular oil-tight wheel box 112 secured to the right side of the vehicle frame by a transverse and horizontal pivot pin 113 (see FIG. 3) at the rear end of the box and a three-point stabilizing hinge 114 (see FIG. 4) at the forward end of the box. The pivot pin 113 is collinear with the axis of rotation of steering drum 82. The stabilizing hinge includes an upper link 115 connected at its rear end to the wheel box by a horizontal and transverse pin 116. The forward end of the link 115 is connected by a horizontal and transverse pin 117 to the upper end of a lower link 118, the lower end of which is connected by a horizontal and transverse pin 119 to the frame. The hinged connection of the wheel box to the frame improves the traction of the vehicle in moving over uneven terrain, as explained more fully below.

A right-hand middle wheel chain 120 is disposed around a sprocket 121 mounted on the right-hand end of shaft 109, and extends forward around a first sprocket 122 mounted on the right-hand wheel drive shaft 123 journalled through the right-hand side of the frame and the outboard wall 124 of the wheel box 112, which is described in more detail below.

A right-hand forward wheel chain 125 is disposed around a second sprocket 126 mounted on the inboard portion of the right-hand drive shaft 123, and extends forwardly around a sprocket 128 mounted on a right-hand forward axle 130 supported at each end for rotation by oil-sealed bearings 132 mounted on opposite sides of the right-hand wheel box 112.

A right-hand forward wheel 134 (see FIG. 2) is secured to a right-hand forward wheel flange 136 mounted on the outboard end of the right-hand forward axle 130 sealed through the outer wall 124 of the wheel box. A right-hand middle wheel 138 (see FIG. 2) is secured to a right-hand middle wheel flange 140 mounted on the outboard end of the drive shaft 123 disposed through an oil-sealed bearing 142 sealed in the outboard wall 124 of the right-hand wheel box. The inboard end of the drive shaft 123 is set in a bearing 144 mounted on the inner wall of the right-hand wheel box.

A right-hand rear wheel chain 146 is disposed around a third sprocket 148 mounted on the drive shaft 123, and extends rearwardly around a sprocket 150 mounted on a horizontal and transverse rear axle 152 having its inner end supported in a bearing 154 mounted on the inside wall 111 of the wheel box 112, and having its outboard end extending through an oil-sealed bearing 156 sealed through the outside wall 124 of the wheel box. A right rear wheel 158 (see FIG. 2) is mounted on a wheel flange 160 secured to the outboard end of the right rear axle 152.

The left steering mechanism 162 is identical with the right steering mechanism, and includes a left steering lever 164 for operating the steering mechanism in a manner exactly like that described below in detail for the right steering mechanism. The left steering mechanism also includes a third sprocket 166 mounted on the left end of the power driving shaft 62. A chain 168 is disposed around the third sprocket 166 and a sprocket 170 mounted on the left end of a horizontal and transverse shaft 172 journalled at each end in a pair of upright left pivot arms 174, which are adapted to pivot in respective vertical planes about the driving shaft 62. A left-hand driving roller 175 is mounted on the shaft 162, and includes three outboard pulleys 176, and three inboard pulleys 178. A set of three left-hand forward steering belts 180 are disposed around the three outboard pulleys on the driving roller, and extend rearwardly over three pulleys 182 formed integrally on the outboard end of a horizontal and transverse left-hand steering drum 183 mounted on a shaft 184 supported at each end by journals 186 mounted on the upper ends of separate respective drum supports 190.

A set of three left-hand reverse steering double-V belts 192 are disposed around three pulleys 194 formed integrally on the inboard end of the left-hand steering drum, and extend forwardly over three pulleys 196 on an upper left-hand idler 197, and around three pulleys (not shown) on a lower left-hand reverse idler (not shown), which is supported from an upright left-hand idler post 198. A spring loaded left-hand idler arm 200 is connected by a pivot pin 202 to the upper end of the left-hand idler post exactly as described below in detail with respect to the right-hand idler post shown in FIG. 6.

The left-hand steering drum drives a left-hand drive shaft 204 through a chain 206 disposed around a sprocket 208 mounted on the left-hand drum shaft 184, and around a sprocket 210 mounted on the inboard end of the shaft 204, which extends through an oil-sealed bearing 212 sealed in the inboard wall 213 of a left-hand wheel box 214 secured to the left side of the vehicle frame by a transverse and horizontal pivot pin 215 at the rear end of the box, and a three-point stabilizing hinge 216 at the forward end of the box. The hinge 216 is constructed exactly like its counterpart, hinge 114 on the forward end of the right-hand wheel box, and the pin 215 is collinear with its counterpart, pivot pin 113 on the right-hand wheel box. A left-hand middle wheel chain 217 is disposed around a sprocket 218 on the shaft 204 and around a sprocket 219 on a middle wheel axle 220 supported at its inboard end in a bearing 222 mounted on the inboard wall 213 of the left-hand wheel box 214, and extending through an oil-tight bearing 224 mounted in the outer wall 226 of the left-hand wheel box, which is closed to be oil-tight by front, rear, bottom, and top walls 227, 228, 229, and 230, respectively. A left-hand middle wheel flange 231 is mounted on the outboard end of the left-hand middle axle. A left forward wheel chain 232 is disposed around a sprocket 234 mounted on the left middle axle, and around a sprocket 236 mounted on a horizontal and transverse left forward axle 238 supported at its inboard end in a bearing 240 mounted on the left side of the frame. The outboard end of axle 238 extends through an oil-tight bearing 242 sealed in the outer wall of the left-hand wheel box. A left-hand forward wheel flange 244 is mounted on the outboard end of axle 238.

A left-hand rear wheel chain 246 is disposed around a sprocket 248 mounted on the left-hand middle wheel axle, and around a sprocket 250 mounted on a transverse and horizontal left-hand rear wheel axle 252 supported at its inboard end in a bearing 254 mounted on the inboard wall of the left-hand wheel box. The outboard end of the axle 252 extends through an oil-tight bearing 256 sealed in the outboard wall 226 of the left-hand wheel box. A left-hand rear wheel flange 258 is mounted on the outboard end of the axle 252. Left-hand forward, middle and rear wheels 259, 260, 261 (see FIG. 2) are respectively mounted on the left-hand forward, middle, and rear wheel flanges.

A transverse equalizing bar 262 is secured at its center by a horizontal and longitudinal pivot pin 263 to an upright bracket 264 welded to the frame bottom just behind the engine. The right and left ends of the bar are respectively secured by right and left horizontal and longitudinal pivot pins 265, 266 to separate brackets 267, 268, respectively welded to the tops of the right and left wheel boxes. Thus, each wheel box is free to pivot about an axis passing through the axes of the steering drums. This arrangement improves the traction of the vehicle because as one set of wheels is lifted by an obstruction, the other side is forced down by the equalizing bar to prevent the other set from also being lifted. The vertical movement of the wheel boxes is limited by the stabilizing hinges at their forward ends.

The steering mechanism is supplied power from the engine as shown most clearly in FIG. 5 which shows the details of the clutch 50. The clutch lever 48 is secured at its lower end by a transverse and horizontal pivot pin 269 to the bottom of the frame. A longitudinal link 270 is connected by a pivot pin 271 at its forward end to an intermediate point on the clutch lever. The rear end of the link 270 is connected by a pivot pin 272 to the lower end of an upright toggle 274, which is secured by a pivot pin 276 at its middle to a bracket 278 mounted on the frame 12. Thus, the toggle 274 is free to pivot in a vertical and longitudinal plane.

The rear end (right end as viewed in FIG. 5) of an elongated and longitudinal first connecting rod 280 is secured by a pivot pin 281 to the lower end of the toggle 274. The forward end of the first connecting rod 280 is secured by a horizontal and transverse pivot pin 282 to the lower end of a first crank 284 which is secured at its center by a horizontal and transverse pivot pin 286 to a bracket 288 mounted on the frame 12. The upper end of the first crank is secured by a horizontal and transverse pivot 290 to a sleeve 292 in which there is disposed a first slide rod 294. The forward end of the first slide rod 294 extends out beyond the sleeve 292 and is threaded to receive a nut 296 which bears against the forward end of a compression spring 298 coaxially disposed around the first slide rod 294. The rear end of the spring bears against the forward end of the sleeve 292.

The rear end of a first slide rod 294 is connected by a horizontal and transverse pivot pin 300 to an intermediate point of a longitudinally extending first clutch arm 302. The forward end of the clutch arm is secured by a transverse and horizontal pivot pin 304 to a bracket 306 mounted on the frame 12. A reverse clutch pulley 308 is secured by a horizontal and transverse shaft 310 to the rear end of the first clutch arm. As shown in FIG. 5, the clutch lever 48 is in the position so that the reverse clutch pulley is held out of contact with the reverse transmission belts 40 so the belts make a slip fit and do not transmit power from the engine shaft 30 to the reverse drive shaft 46 in the transmission 38.

A second longitudinal connecting rod 312 is secured at its rear end by a horizontal and transverse pivot pin 314 to the upper end of the toggle 274. The forward end of the second connecting rod is secured by a horizontal and transverse pivot pin 315 to the lower end of a second crank 316 secured by the pivot pin to the bracket 288. The upper end of the second crank 316 is secured by a transverse and horizontal pivot pin 318 to a second sleeve 320 in which is disposed a second longitudinal slide rod 322. The forward end of the second slide rod extends forward of the second sleeve 320 and is threaded to receive a nut 324 which bears against the forward end of a compression spring 326 coaxially disposed around the second slide rod so the rear end of the spring bears against the forward end of the second sleeve 320. The rear end of the second slide rod is secured by a horizontal and transverse pivot pin 328 to the intermediate portion of a second longitudinally and upwardly extending clutch arm 330 secured at its lower end by the pivot pin 304 to the bracket 306. A forward clutch pulley 332 is mounted on a horizontal and transverse shaft 334 carried by the upper end of the second clutch arm. As shown in FIG. 5, the clutch lever 48 is in the forward position shown by the solid lines so that the second connecting rod is pulled to the rear causing the second crank to tend to pivot in a counterclockwise direction (as viewed in FIG. 5) and pull the forward clutch pulley up into contact with the forward belt 31 so that power is transmitted from the engine output shaft 30 to the forward input shaft 36 in the transmission. The pivot pin 318 connecting the second sleeve to the second crank 316 is below the pivot pin 286 so that the downward force on the forward clutch pulley tends to cause the second crank to rotate in a counterclockwise direction against the second connecting rod 312 and the toggle 274. However, the toggle is prevented from being moved further because it is stopped against the frame 12, and thus the spring 326 and first crank act as an over-center spring-loaded lock to prevent the forward clutch pulley from coming out of engagement with the forward transmission belts 31.

To shift the clutch mechanism to neutral so that no power is delivered from the engine shaft to the transmission, the clutch lever 48 is moved rearwardly to the vertical position shown in phantom line in FIG. 5. This movement rotates the toggle 274 counterclockwise (as viewed in FIG. 5) about pivot pin 276 to a substantially vertical position, and causes the second crank to pivot in a clockwise direction about pivot pin 286, thereby releasing the forward clutch pulley 332 from contact with the forward transmission belts 31. The reverse clutch pulley 308 is moved toward the reverse transmission belts 40, but not a sufficient distance to engage the belts with enough force to cause power to be transmitted from the engine shaft to the transmission. With the clutch lever in the neutral position, both the forward and reverse transmission belts are sufficiently slack so that there is no power transmitted from the engine shaft. Further movement of the clutch lever to the rearward position places the lever in the reverse position shown in phantom line in FIG. 5. This movement pivots the first crank 284 in a counterclockwise direction (as viewed in FIG. 5) to pull the reverse clutch pulley 308 into firm frictional contact with the reverse belts 40. The compression spring 298 permits the first crank to swing "over center" so that the downward force of the reverse belts on the reverse clutch pulley 308 tends to cause the first crank to rotate further in the counterclockwise direction. However, as with the second crank, this further movement is prevented by the lower end of the toggle 274 bearing against the frame 12. Thus, the clutch mechanism permits power to be delivered from the engine to drive the transmission either forward, reverse, or not a all simply by setting the clutch lever in either of three positions.

Referring to FIG. 7, which shows the details of the right-hand steering mechanism, the right steering lever 74 is secured intermediate its ends by a transverse and horizontal pivot pin 350 to a longitudinally extending bracket 352 secured at its forward end to the frame 12. A horizontal and longitudinal connecting rod 354 is secured at its forward end (left-hand end as viewed in FIG. 7) by a horizontal and transverse pivot pin 356 to the lower end of the right-hand steering lever 74. The rear end of the rod 354 is secured by a horizontal and transverse pivot pin 358 to the lower end of a right-hand steering crank 360, which is secured at its center by a horizontal and transverse pivot pin 362 to an upright bracket 364 mounted on the frame 12. A right steering sleeve 366 is connected by a horizontal and transverse pivot pin 368 to the upper end of the right steering crank 360. The pivot pin 368 extends to the left of the crank 360, and serves as a roller on which rests the rear portion of a horizontal and longitudinal flat spring 369 secured at its front end to the frame 12. A slidable rod 370 is disposed in the sleeve 366. The forward end of the slidable rod 370 extends forward of the forward end of the sleeve 366 and is threaded to receive a nut 372 which bears against a compression spring 374 coaxially disposed around the slidable rod 370 and confined between the nut 372 and the forward end of the sleeve 366. The rear end of the slidable rod 370 is connected by a horizontal and transverse pivot pin 376 to an intermediate point of the outboard one of the right steering pivot arms 72. A longitudinal tension spring 378 is connected at its forward end to the lower end of the right-hand steering lever, and at its rear end to the frame 12.

With the right steering lever in the position shown in FIG. 7, the right steering mechanism is set so that the driving roller 70 is forced into engagement with the right forward steering belt 78, causing the right steering drum 82 to turn in a direction to drive the right wheels forward. The spring and crank arrangement in the right steering mechanism forms an over-center spring-loaded lock so that the tension in the belt 78, which urges the driving roller to the rear (right, as viewed in FIG. 7), tends to cause the right steering crank 360 to pivot in a counter-clockwise direction (as viewed in FIG. 7), because pivot pin 368 is below pivot pin 362. However, the rotation of the right steering crank is prevented because the right steering lever is stopped against the frame 12. To disengage the right driving roller 70, the right steering lever is pulled to the rear so the right steering crank is rotated in a clockwise direction (as viewed in FIG. 7). This causes the right-hand steering pivot arms 72 to pivot in a clockwise direction and move the driving roller 70 toward the rear (right as viewed in FIG. 7), and toward the reverse steering belts 86. Further movement of the right steering lever to the rear forces the driving roller 70 into engagement with the reverse steering belts 86 so that the right steering drum 82 is turned in the direction to cause the right wheels to be driven in reverse. A collar 377 is fastened to the slidable rod 370 to act as a stop when the right steering lever is pulled to the rear to force the driving roller into engagement with the reverse steering belts 86. With the right steering lever in the neutral position, there is sufficient slack in both the forward and reverse steering belts so that the right steering drum is not turned in either direction. In addition, the right steering drum may be locked against rotation by the application of pressure from a brake shoe 380, which is actuated through linkage 382 connected to a right brake pedal 384 (see FIG. 1) on the top of the frame.

The left-hand steering mechanism is identical to the right steering mechanism and a detailed description of it is not necessary. The left-hand steering mechanism is also provided with a brake (not shown) actuated by a left-hand brake pedal 386 located on the frame (see FIG. 1).

The operation of the steering mechanism is as follows:

The clutch lever 48 is moved to the neutral position, and the engine is started. The gear shift lever 52 on the transmission is shifted to the desired gear. The clutch lever is pushed forward to the position shown in FIG. 5, so that the engine shaft supplies power to the input shaft 36 of the transmission to cause the transmission output shaft to turn in a forward direction at a speed determined by the position of the transmission gear shift 52. Both the right and left-hand steering levers are in the forward position so that both the right and left-hand wheels are turned together at the same speed, thereby causing the vehicle to move straight ahead. To stop, the clutch lever 48 is moved to the neutral position, and the brakes are applied to the respective steering drums. To turn to the right, both brakes are released, the clutch lever moved to the forward drive position, the right steering lever is pulled all the way back to drive the right wheels backward, and the left steering lever is held by springs (not shown) in the forward position so the left wheels are turned in the forward direction at exactly the same speed the right wheels are turning in the reverse direction. This causes the vehicle to turn about an upright axis located on the midpoint of a straight line passing through the axles of the middle wheels on the left and right-hand sides. There is no scraping or sliding of the center wheels, since they act as a fulcrum for the turning of the vehicle. There is some sliding and scraping of the forward and rear wheels on each side of the vehicle, but these wheels are turning so that the friction between them and the ground is less than if the wheels were merely braked to a stop. In addition, these wheels are constantly providing different points of wheel-to-ground contact, further reducing and distributing the wear on them. Most important, the wheels are turning as they move to meet rocks or other obstructions so that they aid in working themselves over the obstructions, thereby substantially reducing the strain and wear on the wheel below that which would occur if they were not rotating. The vehicle is turned in the opposite direction simply by reversing the position of the steering levers.

The pivoted mounting of the wheel boxes at their rear ends permits each set of wheels to crawl up over obstructions without reducing the traction of the other set. In fact, the equalizing bar maintains or even increases the traction of the set of wheels at the lower elevation, and minimizes tilting of the vehicle frame.

The steering mechanism of this invention operates equally as well as a track type drive as far as traction, pull, and climb are concerned, and is superior in maneuverability. Moreover, a vehicle using the multi-wheel steering mechanism can easily be driven from one location to another over a highway, and without damage to the road surface. Such versatility is not possible with present track-type vehicles.

I claim:

1. A steering mechanism comprising a frame having forward and rear ends and right and left sides, a source of power mounted on the frame, a first set of rotatable wheels mounted on the right side of the frame, a second set of rotatable wheels mounted on the left side of the frame, a first rotatable driving roller mounted on the frame to be movable in a direction transverse to its axis of rotation, means for transmitting power from the source to rotate the first driving roller, a rotatable first driven drum mounted on the frame, means coupling the first driven drum to rotate the first set of wheels, a first endless belt looped around the first driven drum, a first rotatable idler mounted on the frame, a second endless belt laterally spaced from the first belt and looped around the first driven drum and first idler roller, the first driving roller being disposed inside the first belt and outside the second, means for moving the first driving roller to be in contact with the first belt and out of contact with the second belt so the first driven drum and first set of wheels are forced to rotate in one direction, and for moving the first driving roller to be in contact with the second belt and out of contact with the first belt so the first driven drum and first set of wheels are forced to rotate in the opposite direction, a second rotatable driving roller mounted on the frame to be movable in a direction transverse to its axis of rotation, means for transmitting power from the source to rotate the second driving roller, a second rotatable driven drum mounted on the frame, means coupling the second driven drum to rotate the second set of wheels, a third endless belt looped around the second driven drum, a second rotatable idler roller mounted on the frame, a fourth endless belt laterally spaced from the third belt and looped around the second driven drum and second idler roller, the second driving roller being disposed inside the third belt and outside the fourth, and means for moving the second driving roller to be in contact with the third belt and out of contact with the fourth belt so the second driven drum and second set of wheels are forced to rotate in one direction, and for moving the second driving roller to be in contact with the fourth belt and out of contact with the third so the second driven drum and second set of wheels are forced to rotate in the opposite direction.

2. Apparatus according to claim 1 in which the ratio of the diameter of the portions of the first driving roller and first driven drum contacted by the first belt is substantially the same as the ratio of the diameter of the portions of the first driving roller and first driven drum contacted by the second belt, and the ratio of the diameter of the portions of the second driving roller and second driven drum contacted by the third belt is substantially the same as the ratio of the diameter of the portions of the second driving roller and second driven drum contacted by the fourth belt.

3. Apparatus according to claim 2 in which all the said ratios are equal.

4. Apparatus according to claim 1 in which each set of wheels is made up of an odd number, and the center wheels of the two sets are mounted to rotate about collinear axes.

5. Apparatus according to claim 1 in which each set of wheels is mounted to pivot with respect to the frame about a respective transverse axis.

6. Apparatus according to claim 5 which includes a transverse equalizing bar secured between its ends to the frame to pivot about a longitudinal axis and secured to the first and second sets of wheels so that as one set of wheels moves up the other set is forced down with respect to the frame.

References Cited in the file of this patent
UNITED STATES PATENTS

| | | |
|---|---|---|
| 1,073,055 | Mayhall | Sept. 9, 1913 |
| 1,236,749 | Osser | Aug. 14, 1917 |
| 1,505,574 | Meyers | Aug. 19, 1924 |
| 1,577,396 | White | Mar. 16, 1926 |
| 1,968,043 | Knox et al. | July 31, 1934 |
| 1,985,777 | Hamilton | Dec. 25, 1934 |
| 2,074,319 | Baker et al. | Mar. 23, 1937 |
| 2,311,393 | Honeywell | Feb. 16, 1943 |
| 2,450,262 | Winslow et al. | Sept. 28, 1948 |
| 2,554,785 | Leliter | May 29, 1951 |
| 2,602,341 | Lewis | July 8, 1952 |
| 2,809,530 | Wilson | Oct. 15, 1957 |
| 2,880,814 | Sensenig et al. | Apr. 7, 1959 |